United States Patent
Zhang et al.

(10) Patent No.: US 7,983,037 B2
(45) Date of Patent: Jul. 19, 2011

(54) BATTERY COVER MECHANISM

(75) Inventors: Yu Zhang, Shenzhen (CN); Guo-Zhao Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 89 days.

(21) Appl. No.: 12/494,478

(22) Filed: Jun. 30, 2009

(65) Prior Publication Data

US 2010/0035137 A1 Feb. 11, 2010

(30) Foreign Application Priority Data

Aug. 8, 2008 (CN) .......................... 2008 1 0303587

(51) Int. Cl.
H05K 5/00 (2006.01)
H05K 7/00 (2006.01)
H04M 1/00 (2006.01)
A47B 81/00 (2006.01)

(52) U.S. Cl. ......... 361/679.55; 361/679.56; 361/679.57; 361/679.58; 361/679.59; 361/679.27; 455/575.7; 455/575.3; 455/575.4; 455/575.8; 312/223.1; 312/223.2; 312/223.3

(58) Field of Classification Search ............. 361/679.01, 361/679.02, 679.08, 679.09, 679.3, 679.55–679.59; 429/100; 455/325, 556.1, 550.1, 90.1, 575.1; 439/131; 70/357, 367, 406, 381, 491; 200/329; 174/535; 29/557

See application file for complete search history.

(56) References Cited

U.S. PATENT DOCUMENTS

| 7,436,656 B2 * | 10/2008 | Jiang et al. ............... 361/679.55 |
| 2004/0192418 A1 * | 9/2004 | Nam .......................... 455/575.1 |
| 2006/0002078 A1 * | 1/2006 | Jing .............................. 361/685 |
| 2006/0175840 A1 * | 8/2006 | Wang et al. .................. 292/228 |
| 2007/0026888 A1 * | 2/2007 | Zhou .......................... 455/550.1 |

* cited by examiner

*Primary Examiner* — Jayprakash N Gandhi
*Assistant Examiner* — Jerry Wu
(74) *Attorney, Agent, or Firm* — Steven M. Reiss

(57) ABSTRACT

A battery cover mechanism includes a housing, a battery cover and a releasing assembly. The housing has a first surface and at least one latching hook disposed thereon. The battery cover defines a notch therethrough corresponding to the latching hook of the housing and is detachably assembled with the housing by the releasing assembly. The releasing assembly includes a fixing base, an elastic piece and a releasing piece. The fixing base is mounted on the inner side surface of the battery cover and there form an assembling space together with the notch. The elastic piece is mounted on the fixing base and the releasing piece is slidably mounted on the fixing base. The releasing piece is slidably mounted on the fixing base to slidably resist the elastic piece to make the elastic piece release from the latching hook.

20 Claims, 7 Drawing Sheets

BATTERY COVER MECHANISM

BACKGROUND

1. Technical Field

The exemplary disclosure generally relates to battery cover mechanisms, and particularly, to a battery cover mechanism used in a portable electronic device.

2. Description of Related Art

Batteries are widely used in portable electronic devices, such as personal digital assistants (PDAs), mobile phones, and so on. Conventional batteries are detachably received in the electronic device, and battery cover mechanisms are designed to connect with housings of the electronic devices to package the batteries, thus the batteries and the inner circuits of the portable electronic devices are well protected.

A conventional battery cover mechanism generally includes a cover and a housing. The cover tightly engages with the housing to be secured thereon. However, due to the tight engagement of the cover and the housing in many conventional designs, a significant amount friction exist between the cover and the housing. As a result, the user may need to apply a significant amount of strength to assemble/disassemble the cover to/from the housing. Further, the cover and the housing may be distorted or even damaged during the assembly/disassembly operations.

Therefore, there is room for improvement within the art.

BRIEF DESCRIPTION OF THE DRAWINGS

Many aspects of the battery cover mechanism can be better understood with reference to the following drawings. These drawings are not necessarily drawn to scale, the emphasis instead being placed upon clearly illustrating the principles of the present battery cover mechanism. Moreover, in the drawings like reference numerals designate corresponding sections throughout the several views.

DETAILED DESCRIPTION

Figure 1:
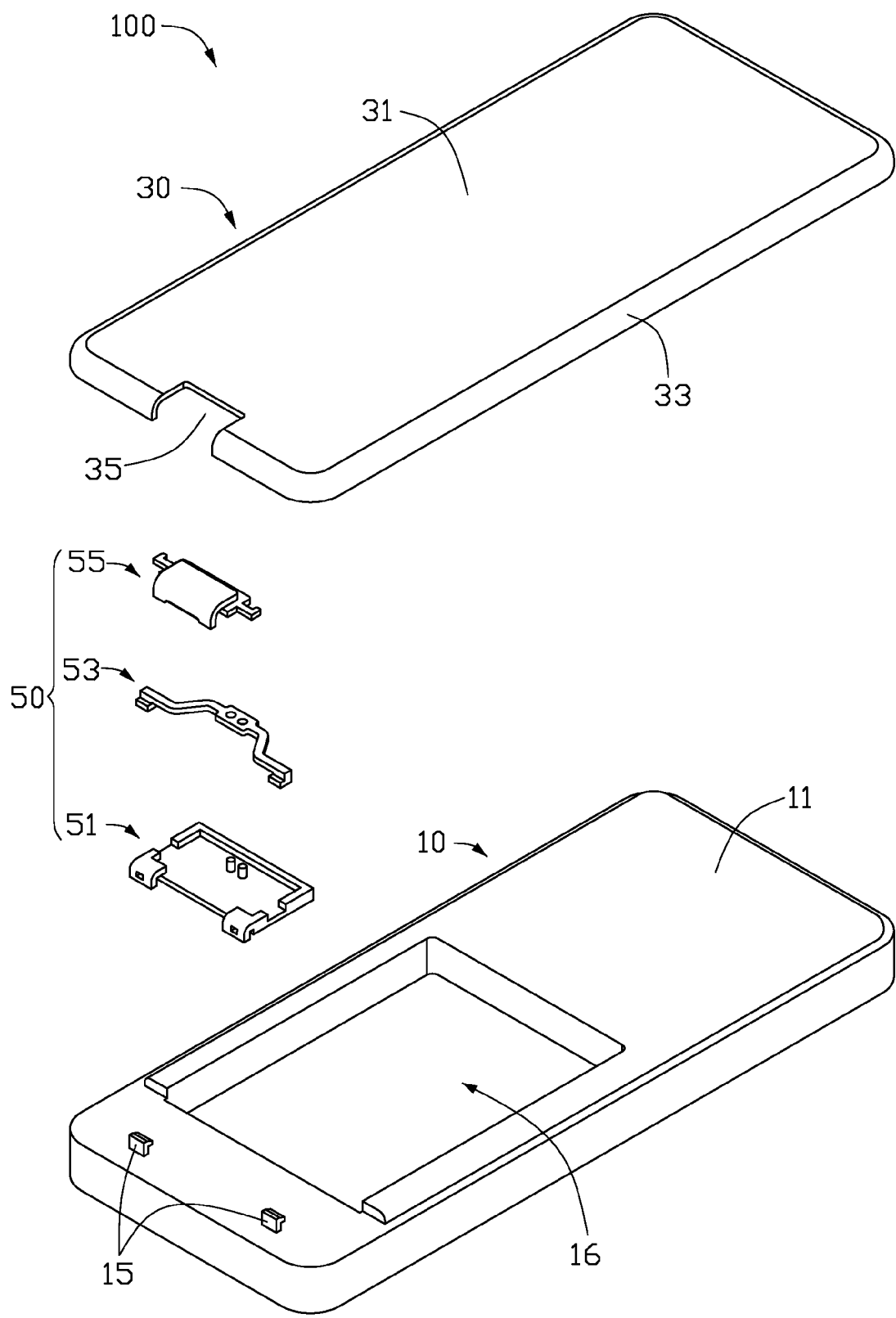
FIG. 1 shows an exploded, perspective view of a battery cover mechanism, in accordance with an exemplary embodiment of the present invention.

Referring to FIG. 1, an exemplary battery cover mechanism 100 for portable electronic devices, such as mobile phones, digital cameras and etc., is shown. The battery cover mechanism 100 includes a housing 10, a batter cover 30, and a releasing assembly 50. The releasing assembly 50 is mounted on the batter cover 30 to detachably assemble the battery cover 30 to the housing 10.

The housing 10 may be a part of a portable electronic device. The housing 10 includes a first surface 11, two latching hooks 15 and a receiving groove 16. The two latching hooks 15 are on the first surface 11 of the housing 10 adjacent to one end thereof for detachably latching with the releasing assembly 50. The receiving groove 16 is recessed from the first surface 11 of the housing 10 for receiving a battery (not shown).

Figure 2:
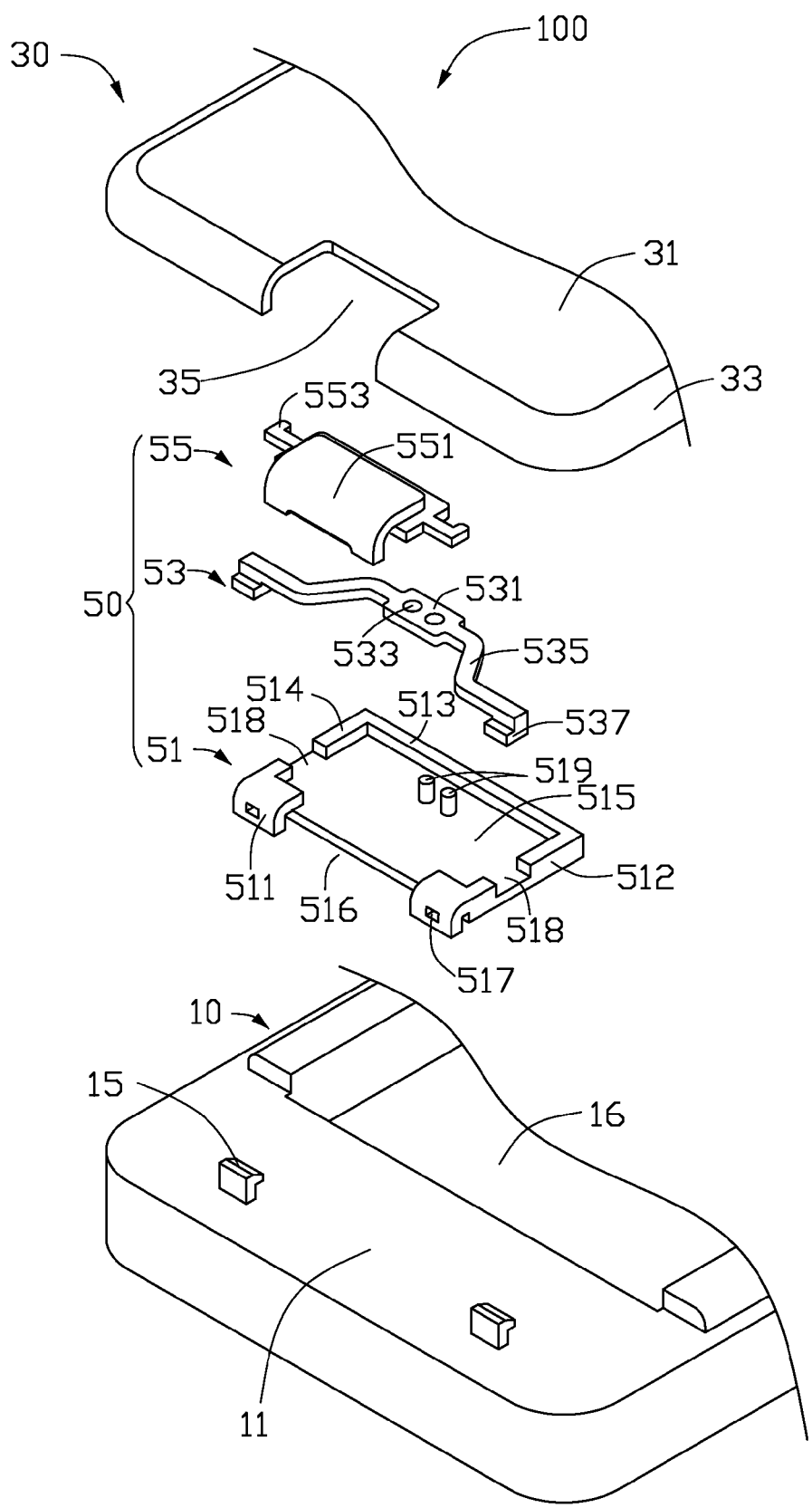
FIG. 2 shows a partial enlarged view of the battery cover mechanism shown in FIG. 1.
Figure 3:
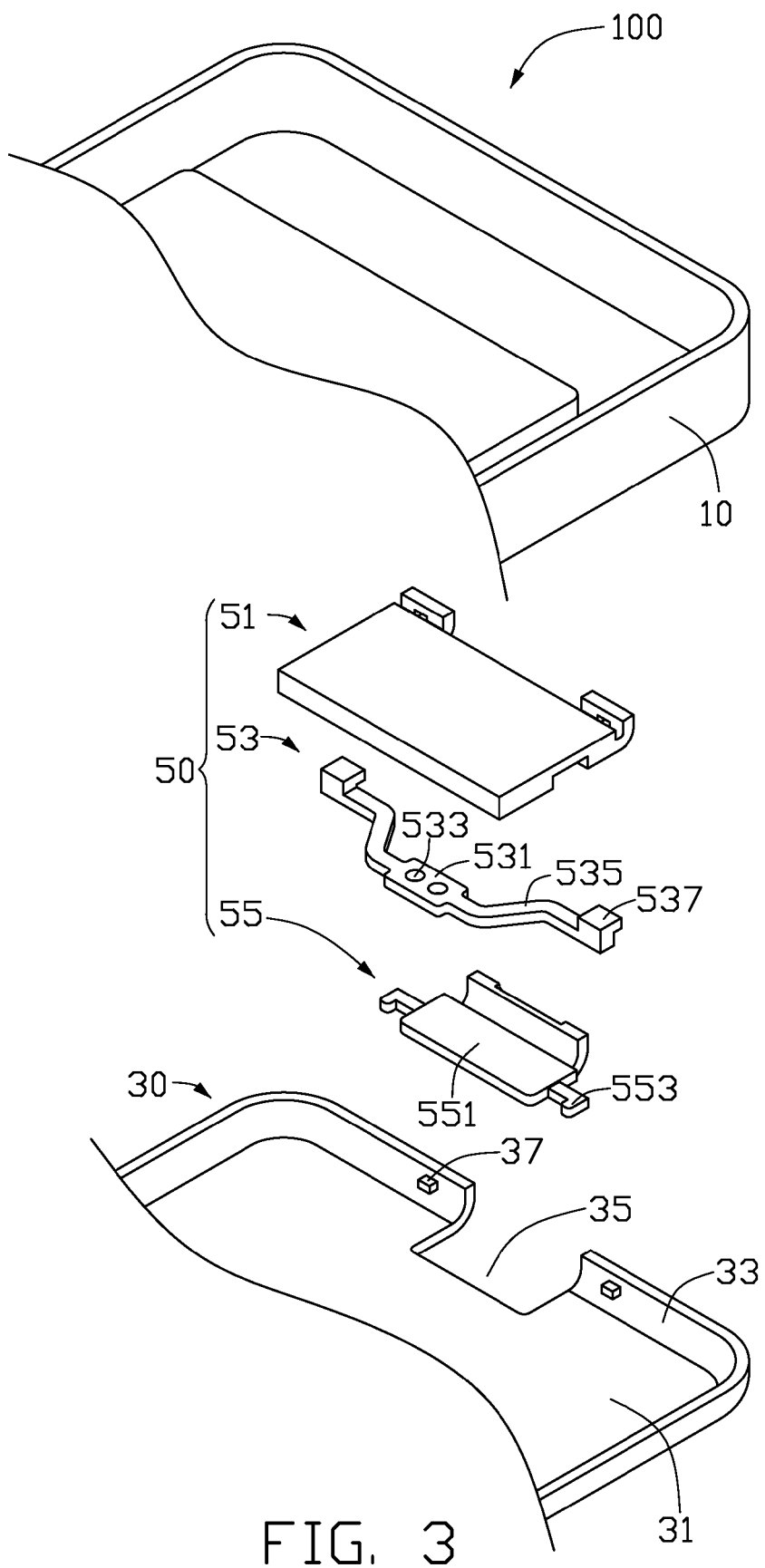
FIG. 3 is similar to FIG. 2, but shown in another view angle.
Figure 4:
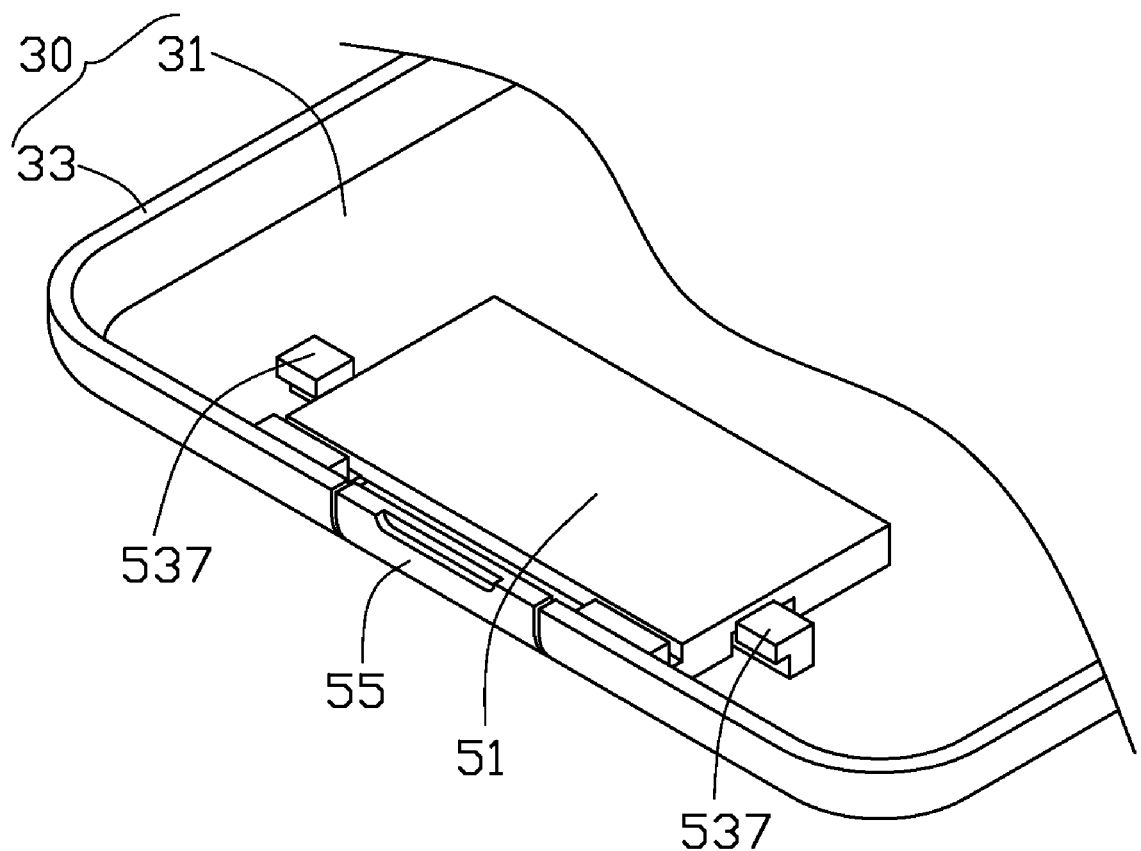
FIG. 4 shows a partial enlarged perspective view of the battery cover mechanism, wherein, the releasing assembly is mounted on the battery cover.

Also referring to the FIGS. 2 and 3, the battery cover 30 is detachably mounted on the first surface 11 of the housing 10 to cover the receiving groove 16. The battery cover 30 includes a top wall 31 and a peripheral wall 33 substantially perpendicularly extending from the peripheral edge of the top wall 31. The battery cover 30 has a substantially notch 35 defined at one end thereof for assembling the releasing assembly 50. The peripheral wall 33 includes two spaced latching blocks 37 disposed thereon and positioned adjacent to the two sides of the notch 35 respectively to assemble the releasing assembly 50 to the battery cover 30.

The releasing assembly 50 is mounted on the battery cover 30 and partially accommodated within the notch 35 of the battery cover 30. The releasing assembly 50 includes a fixing base 51, an elastic piece 53 and a releasing piece 55. The fixing base 51 is shaped and configured to be mounted on the inner side surface of the battery cover 30 corresponding to the notch 35 thereof. The fixing base 51 and the notch 35 of the battery cover 30 cooperatively form an assembling space (not labeled) used to assemble and accommodate the elastic piece 53 and the releasing piece 55 therein. In the present embodiment, the fixing base 51 defines a recess 515 therein to assemble the elastic piece 53 and the releasing piece 55. The recess 515 includes a bottom wall (not labeled), a first sidewall 511, two opposite and parallel second sidewalls 512, 514 and a third sidewall 513 parallel to the first sidewall 511. The bottom wall includes two posts 519 protruding therefrom. The two posts 419 are spaced apart from each other. The first sidewall 511 has an arcuate outline corresponding to the notch 35 of the battery cover 30 and defines a gap 516 therethrough in the substantially middle portion thereof communicating with the recess 515. The two sides of the first sidewall 511 adjacent to the gap 516 both define a latching groove 517 therethrough corresponding to the two latching blocks 37 of the battery cover 30 respectively to assemble the fixing base 51 to the battery cover 30. The two opposite second sidewalls 512, 514 each defines an opening 518 therethrough in the substantially middle portion thereof communicating with the recess 515 respectively.

The elastic piece 53 is substantially bow shaped and includes an assembling pedestal 531 and two elastic arms 535 extending and bending outwardly from the two ends of the assembling pedestal 531. The assembling pedestal 531 is substantially rectangular board shaped and defines two spaced assembling through holes 533 therethrough corresponding to the two spaced posts 519 of the fixing base 51. The two elastic arms 535 both includes a latch 537 disposed at the distal end thereof corresponding to the two latching hooks 15 of the housing 10 respectively.

The releasing piece 55 is a key slidably assembled with the battery cover 30 and accommodating within the assembling space formed together by the fixing base 51 and the notch 35 to assemble the battery cover 30 to the housing 10 and detach the battery cover 30 from the housing 10. The releasing piece 55 includes a pressing key 551 and two pushing arms 553 disposed at the two ends of the pressing key 551 respectively corresponding to the two elastic arms 535 of the elastic piece 53. The pressing key 551 is substantially arcuate and has substantially the same dimension as the notch 35. The two pushing arms 553 are substantially L-shaped protruding outwardly from the two ends of the pressing key 551.

Figure 6:
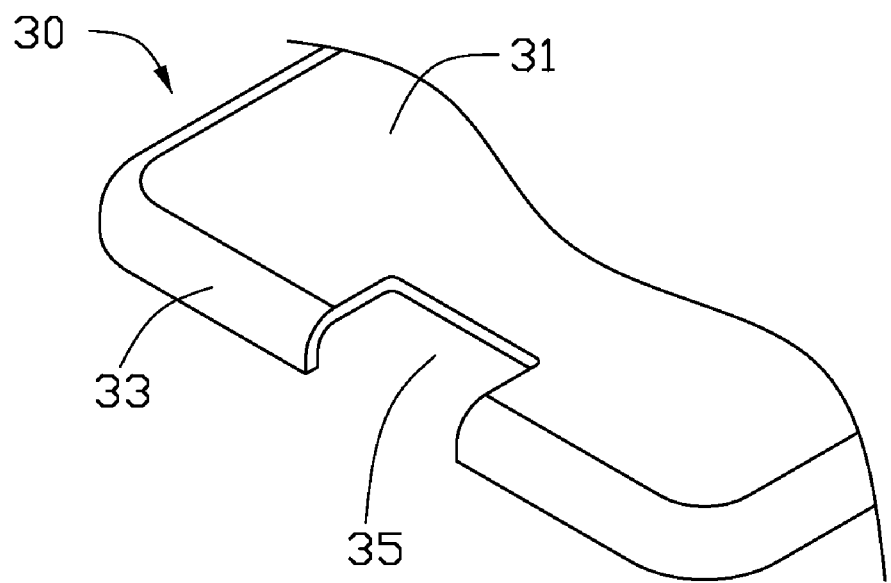
FIG. 6 shows a partial enlarged perspective view of the battery cover mechanism, wherein, the releasing assembly latches with the housing.
Figure 6:
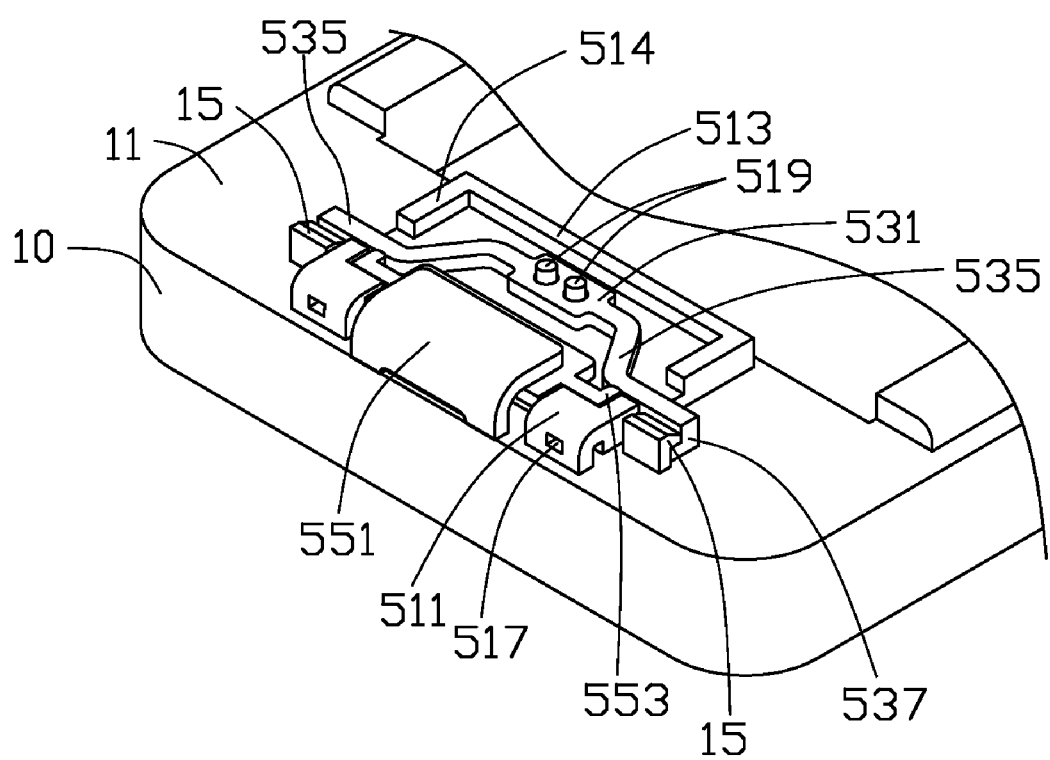

Referring to FIG. 2, FIG. 3 and FIG. 6, in assembly, the elastic piece 53 is assembled within the recess 515 of the fixing base 51, the two posts 519 of the fixing base 51 penetrate through the two assembling through holes 533 of the assembling pedestal 531 respectively to fix the assembling pedestal 531. The two elastic arms 535 penetrate through the two openings 518 of the fixing base 51 and the two latches 537 expose out of the second sidewall 512 and the fourth sidewall 514 respectively corresponding to the two latching hooks 15 of the housing 10. The releasing piece 55 is slidably assembled within the recess 515 of the fixing base 51, and the pressing key 551 is accommodated within the corresponding gap 516 of the fixing base 51. The two pushing arms 553 resist on the two elastic arms 535 respectively to make the two elastic arms 535 slide relative to the fixing base 51 within the recess 515. The assembled fixing base 51 is fixed to the battery cover 30, the two latching blocks 37 of the battery 30 are latched into the corresponding two latching groove 517 of the fixing base 51 respectively and the releasing piece 55 is accommodated within the notch 35 of the battery cover 30.

Figure 5:
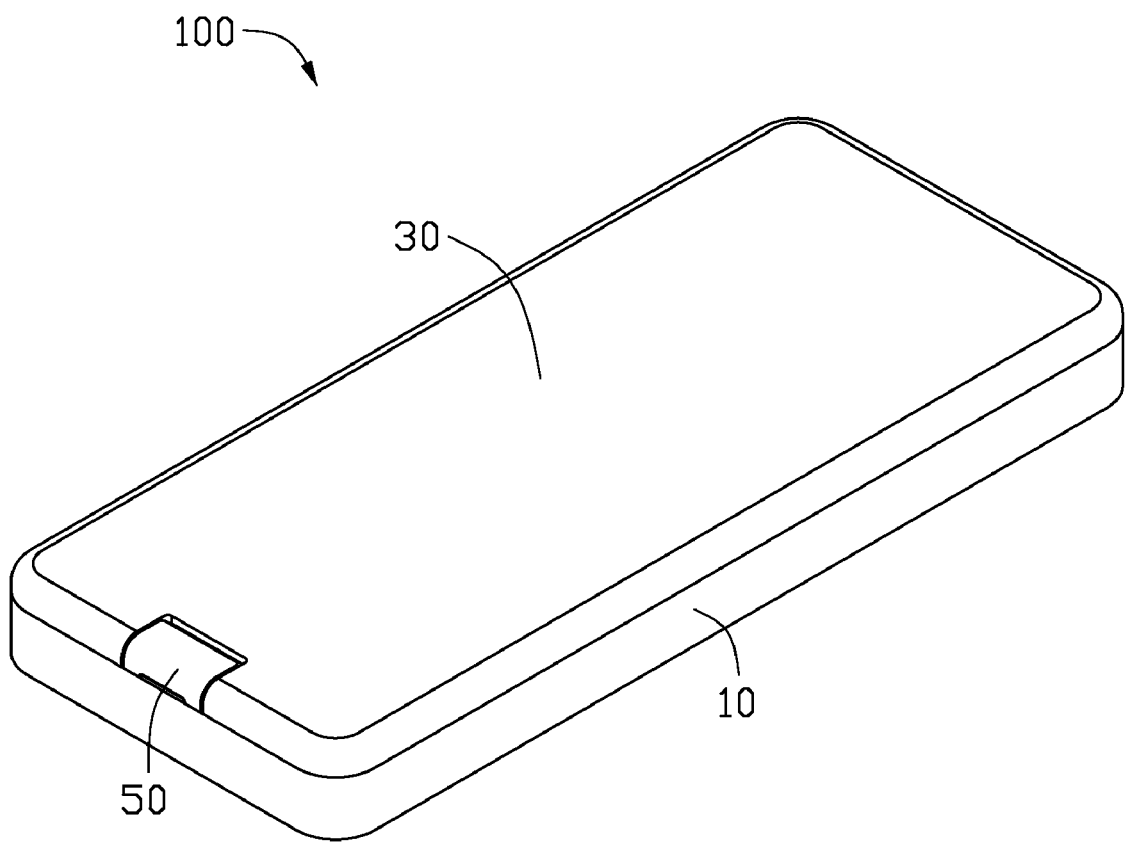
FIG. 5 shows a perspective view of the battery cover mechanism, wherein, the battery cover is mounted on the housing.
Figure 7:
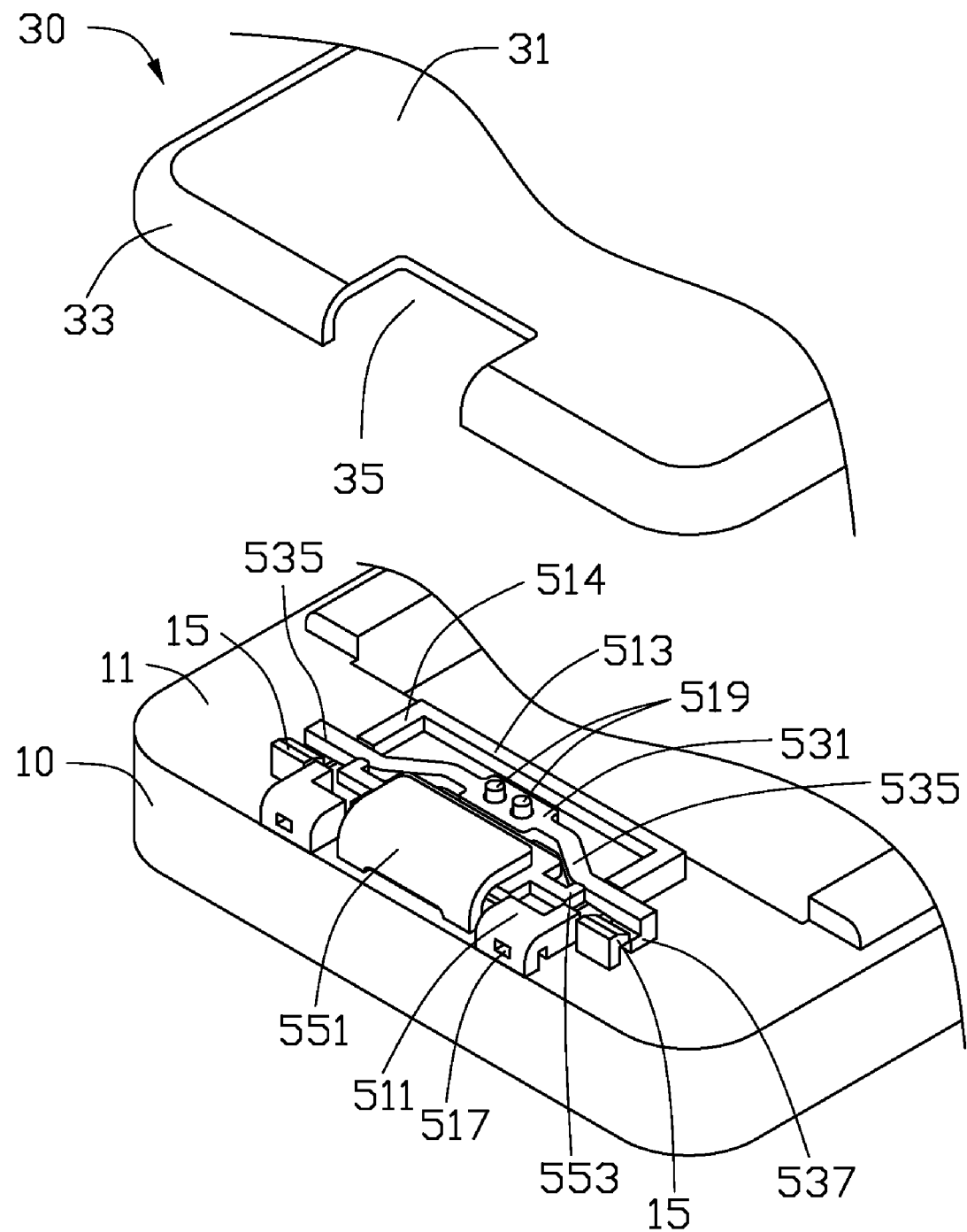
FIG. 7 is similar to FIG. 6, wherein, the releasing assembly is pushed away from the housing for detaching the battery cover from the housing.

Also referring to FIG. 5 and FIG. 7, when the battery cover 30 needs to be assembled to the housing 10, the battery cover 30 is mounted on the first surface 11 of housing 10; the pressing key 551 is pushed to align the two latches 537 of the elastic piece 53 with the corresponding two latching hooks 15, then, the pressing key 551 is released allowing the two latches 537 of the elastic piece 53 to latch into the corresponding two latching hooks 15, thus, the battery cover 30 is assembled to the housing 10. When the battery cover 30 needs to be detached from the housing 10, the pressing key 551 is pushed to detach the two latches 537 from corresponding two latching hooks 15, then, the battery cover 30 can be detached from the housing 10.

It is to be understood that the number of the latching hooks 15 of the housing 10 is not just limited to two; the number also can be increased or decreased by the needs. For example, the number of the latching hooks 15 can be one or more than two. Correspondingly, the number of the latch 537 of the elastic piece 53 is not just limited to the two, and the number also can be increased or decreased by the needs corresponding to the number of the latching hooks 15 of the housing 10.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover mechanism used in a portable electronic device, comprising:
    a housing having a first surface and at least one latching hook disposed on the first surface;
    a battery cover detachably mounted on the housing and defining a notch; and
    a releasing assembly mounted on the battery cover to assemble the battery cover to the housing and detach the battery cover from the housing, the releasing assembly comprising:
    a fixing base mounted on the battery cover, defining a recess comprising a bottom wall, and forming an assembling space in combination with the notch, the fixing base including two posts spaced protruding from the bottom wall of the recess;
    an elastic piece defining two spaced through holes for assembling with the corresponding posts, the elastic piece comprising at least one latch disposed thereon, the latch detachably latching with the latching hook of the housing; and
    a releasing piece slidably mounted on the fixing base to slidably resist the elastic piece to make the elastic piece release from the latching hook.

2. The battery cover mechanism as claimed in claim 1, wherein there are two latches and two latching hooks, the elastic piece is substantially bow shaped and includes an assembling pedestal fixed to the fixed base and two elastic arms extending outwardly from the two ends of the assembling pedestal, the two latches are disposed at two distal ends of the two elastic arms respectively corresponding to the two latching hooks.

3. The battery cover mechanism as claimed in claim 2, wherein the releasing piece includes a pressing key and two pushing arms disposed at the two ends of the pressing key respectively, the two pushing arms slidably resist on the corresponding two elastic arms respectively.

4. The battery cover mechanism as claimed in claim 3, wherein the elastic piece and the releasing piece are assembled within the recess.

5. The battery cover mechanism as claimed in claim 4, wherein the recess further includes a first sidewall, two opposite second sidewalls, a third sidewall parallel to the first sidewall, the two posts are parallel to the first sidewall, and the through holes are defined in the assembling pedestal.

6. The battery cover mechanism as claimed in claim 5, wherein the first sidewall defines a gap therethrough communicating with the recess; the pressing key is accommodated within the corresponding gap of the fixing base.

7. The battery cover mechanism as claimed in claim 5, wherein the battery cover includes a top wall and a peripheral extending from the peripheral edge of the top wall; the peripheral wall includes two spaced latching blocks disposed adjacent to the two sides of the notch respectively; the two sides of the first sidewall adjacent to the gap both define a latching groove therethrough corresponding to the two latching blocks of the battery cover respectively to assemble the fixing base to the battery cover.

8. The battery cover mechanism as claimed in claim 5, wherein the opposite second sidewalls each defines an opening therethrough communicating with the recess respectively; the two elastic arms penetrate through the two openings such that the two latches expose out of the opposite second sidewalls respectively corresponding to latch the two latching hooks of the housing.

9. The battery cover mechanism as claimed in claim 2, wherein the housing further includes a receiving groove defined therein for receiving a battery; the latching hook disposed on the first surface adjacent to the receiving groove.

10. A battery cover mechanism used in a portable electronic device, comprising:
    a housing having a first surface and a receiving groove, two latching hooks disposed on the first surface adjacent to the receiving groove;
    a battery cover detachably mounted on the housing to cover the receiving groove; and
    a releasing assembly mounted on the battery cover to assemble the battery cover to the housing and detach the battery cover from the housing; the releasing assembly comprising:
    an elastic piece mounted on the battery cover, the elastic piece including two elastic arms, a latch formed at one end of each elastic arm to detachably latch with the corresponding latching hook of the housing; and a releasing piece slidably mounted on the battery cover and to slidably resist the elastic piece, the elastic arms pushed to deform by the releasing piece to detach the latches from the corresponding latching hooks.

11. The battery cover mechanism as claimed in claim 10, wherein the battery cover defines a notch therethrough; the releasing assembly further includes a fixing base mounted on the battery cover, the elastic piece and the releasing piece are mounted on the fixing base.

12. The battery cover mechanism as claimed in claim 11, wherein the fixing base defines a recess therein, the elastic piece and the releasing piece are assembled within the recess, the two latches of the elastic piece expose out of the two opposite sides of the fixing base respectively and lath with the corresponding two latching hooks of the housing.

13. The battery cover mechanism as claimed in claim 12, wherein the recess includes a bottom wall, the bottom wall includes two posts spaced protruding therefrom; the elastic piece further includes an assembling pedestal and two latches disposed at the two ends of the assembling pedestal corresponding to the two latching hooks of the housing respectively; the assembling pedestal defines two spaced assembling through holes therethrough for assembling with the corresponding two spaced posts of the fixing base.

14. The battery cover mechanism as claimed in claim 13, wherein the recess further includes a first sidewall defining a gap therethrough communicating with the recess; the releasing piece includes a pressing key assembled within the corresponding gap of the fixing base and two pushing arms disposed at the two ends of the pressing key respectively, the two pushing arms slidably resist on the two elastic arms of the elastic piece respectively.

15. The battery cover mechanism as claimed in claim 14, wherein the recess further includes a first sidewall, two opposite second sidewalls and a third sidewall parallel to the first sidewall; the second sidewall and the opposite fourth sidewall each defines an opening therethrough communicating with the recess respectively; the two elastic arms penetrate through the two openings and the two latches expose out of the second sidewall and the fourth sidewall respectively corresponding to the two latching hooks of the housing.

16. A battery cover mechanism used in a portable electronic device comprising a releasing assembly mounted on a battery cover to assemble and detach the battery cover from a housing, the battery cover defining a notch, the housing includes a latching hook, the releasing assembly comprising:

a fixing base mounted on the battery cover by forming an assembling space together with the notch, the fixing base defining a recess and at least one opening communicating with the recess;

an elastic piece mounted on the recess of the fixing base, and comprising at least one latch disposed thereon, the at least one latch extending out from the at least one opening to detachably latch with the latching hook of the housing; and a releasing piece slidably mounted on the fixing base to slidably resist the elastic piece to make the elastic piece release from the latching hook.

17. The battery cover mechanism as claimed in claim 16, wherein there are two latching hooks, two latches and two openings.

18. The battery cover mechanism as claimed in claim 17, wherein the recess includes a bottom wall, the bottom wall includes two posts spaced protruding therefrom; the elastic piece further includes an assembling pedestal, the two latches are disposed at the two ends of the assembling pedestal respectively; the assembling pedestal defines two spaced assembling through holes therethrough for assembling with the corresponding two spaced posts of the fixing base.

19. The battery cover mechanism as claimed in claim 18, wherein the recess further includes a first sidewall defining a gap therethrough communicating with the recess; the releasing piece includes a pressing key assembled within the corresponding gap of the fixing base and two pushing arms disposed at the two ends of the pressing key respectively, the two pushing arms slidably resist on the two elastic arms of the elastic piece respectively.

20. The battery cover mechanism as claimed in claim 19, wherein the recess further includes two opposite second sidewalls and a third sidewall parallel to the first sidewall; the two openings are defined in the second sidewalls cooperatively and the two elastic arms penetrate through the two openings.

\* \* \* \* \*